(12) United States Patent
Morimura et al.

(10) Patent No.: US 9,267,447 B2
(45) Date of Patent: Feb. 23, 2016

(54) ENGINE RESTART CONTROL APPARATUS, VEHICLE AND VEHICLE CONTROL METHOD

(75) Inventors: Junichi Morimura, Suntoh-gun (JP); Yasunari Kido, Hadano (JP); Masaki Matsunaga, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 298 days.

(21) Appl. No.: 13/994,886

(22) PCT Filed: Jan. 23, 2012

(86) PCT No.: PCT/JP2012/000375
§ 371 (c)(1),
(2), (4) Date: Jun. 17, 2013

(87) PCT Pub. No.: WO2013/111175
PCT Pub. Date: Aug. 1, 2013

(65) Prior Publication Data
US 2014/0214310 A1    Jul. 31, 2014

(51) Int. Cl.
*F02D 29/02* (2006.01)
*B60W 10/06* (2006.01)
*B60W 30/18* (2012.01)
*F02N 11/08* (2006.01)
*B60W 10/02* (2006.01)

(52) U.S. Cl.
CPC .............. *F02D 29/02* (2013.01); *B60W 10/06* (2013.01); *B60W 30/18018* (2013.01); *F02N 11/084* (2013.01); *B60W 10/02* (2013.01); *B60W 2510/0671* (2013.01); *B60W 2510/18* (2013.01); *F02N 2200/0807* (2013.01); *Y02T 10/48* (2013.01)

(58) Field of Classification Search
CPC ... F02D 13/04; F02D 29/02; F02D 2011/102; F02D 2200/0406; Y02T 10/46; B60K 2741/20; B60W 10/06; B60W 10/182
USPC .............. 701/105, 107, 112–115; 123/179.3, 123/179.4; 477/184, 185, 203
See application file for complete search history.

(56) References Cited

U.S. PATENT DOCUMENTS

| 6,334,834 B1 | 1/2002 | Mizutani et al. |
| 6,434,475 B2 * | 8/2002 | Kaneko et al. ................ 701/112 |
| 2001/0013701 A1 * | 8/2001 | Onoyama et al. ........... 290/40 C |
| 2001/0035159 A1 * | 11/2001 | Tsunooka ..................... 123/399 |

(Continued)

FOREIGN PATENT DOCUMENTS

| CN | 102275584 A | 12/2011 |
| JP | 2002-188480 A | 7/2002 |
| JP | 2011-226316 A | 11/2011 |

*Primary Examiner* — John Kwon
*Assistant Examiner* — Johnny H Hoang
(74) *Attorney, Agent, or Firm* — Kenyon & Kenyon LLP

(57) ABSTRACT

An engine restart control apparatus mounted on a vehicle having an engine and a brake system includes: a negative pressure detector configured to detect booster negative pressure; an engine restart controller configured to restart the engine after a stop of the engine; and a storage memory configured to store the booster negative pressure detected by the negative pressure detector. The engine restart controller restarts the engine when the booster negative pressure is reduced by a first set value or more from a reference booster negative pressure, which is detected at a predetermined timing after the stop of the engine, among booster negative pressures stored in the storage memory.

7 Claims, 8 Drawing Sheets

(56) References Cited

U.S. PATENT DOCUMENTS

| | | | |
|---|---|---|---|
| 2002/0116113 A1* | 8/2002 | Kaneko | 701/112 |
| 2003/0004635 A1* | 1/2003 | Kamiya et al. | 701/112 |
| 2003/0116131 A1* | 6/2003 | Majima et al. | 123/406.53 |
| 2006/0258508 A1* | 11/2006 | Tanioka et al. | 477/203 |
| 2011/0256980 A1 | 10/2011 | Saito et al. | |
| 2011/0270501 A1* | 11/2011 | Ito et al. | 701/70 |
| 2013/0179053 A1* | 7/2013 | Matsunaga | 701/112 |

* cited by examiner

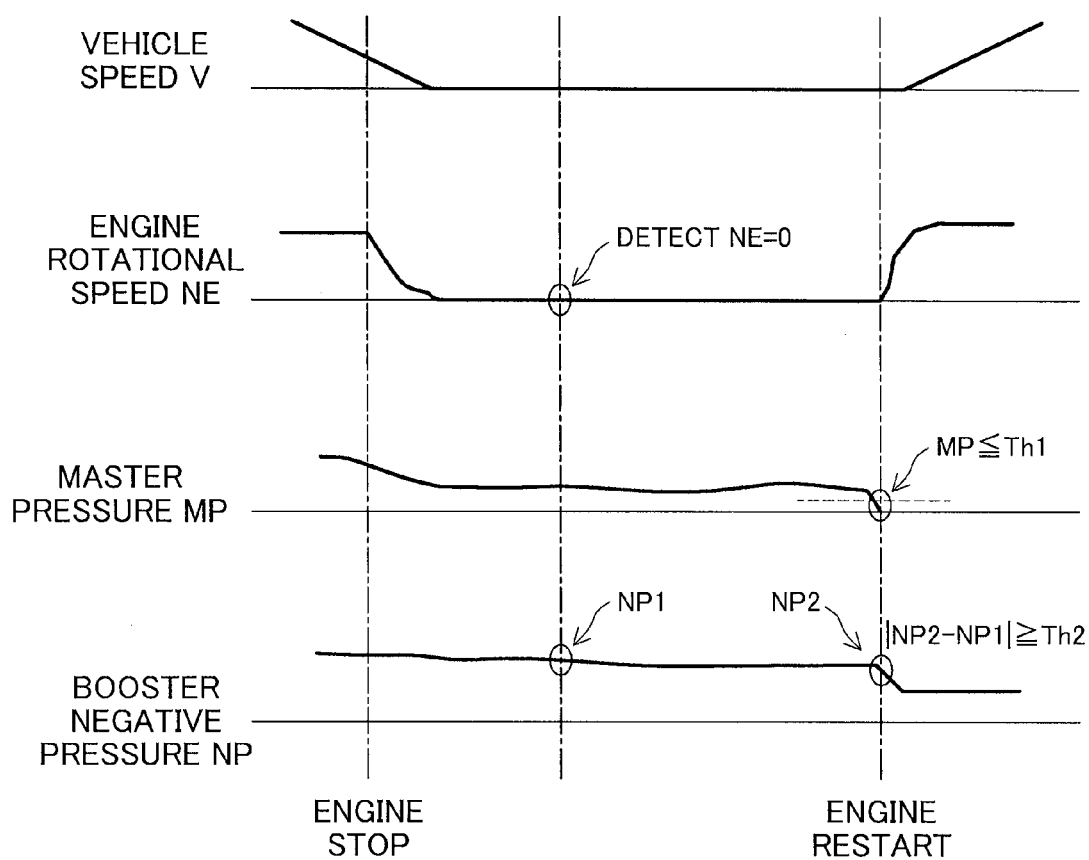

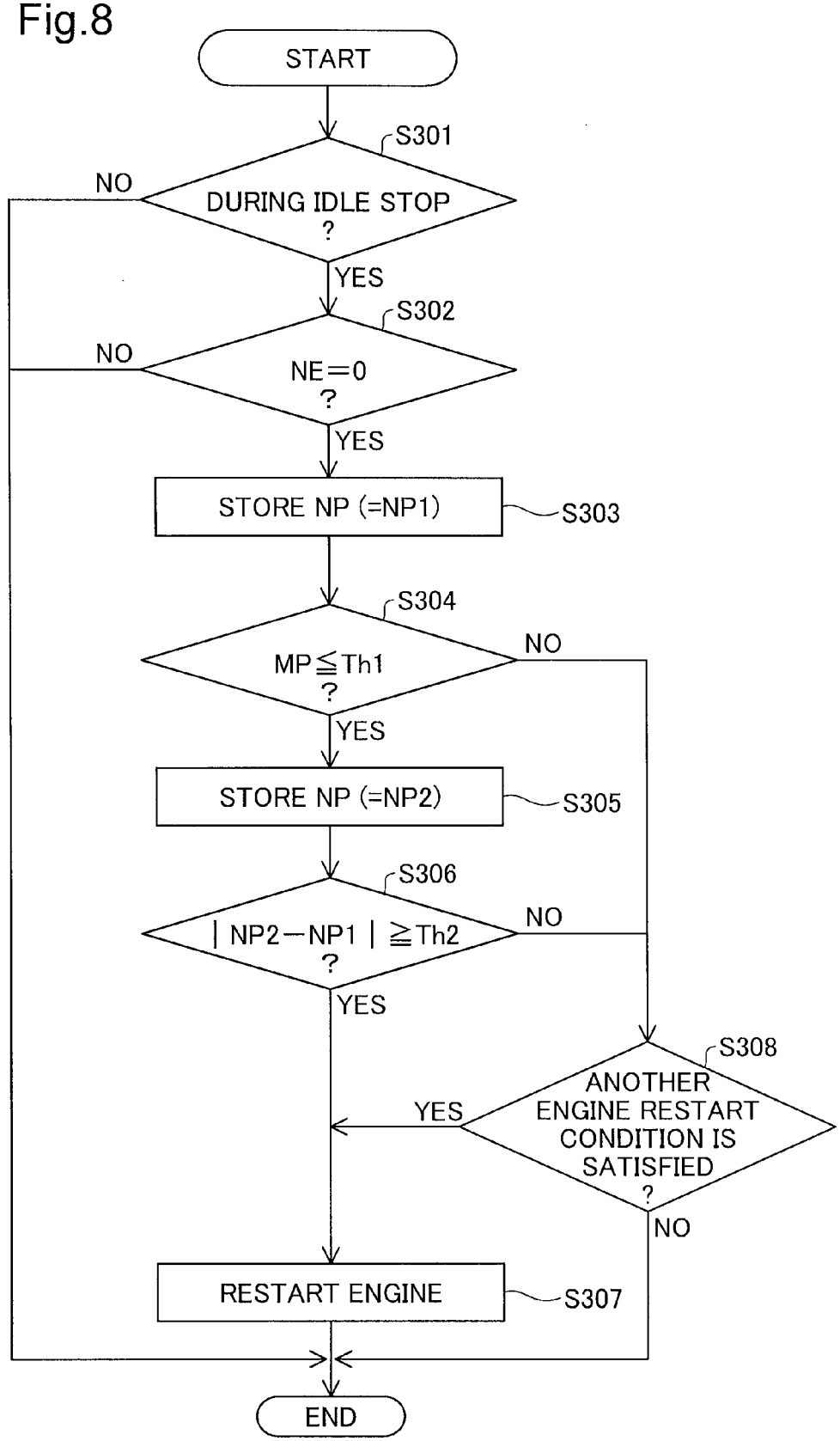

ENGINE RESTART CONTROL APPARATUS, VEHICLE AND VEHICLE CONTROL METHOD

This is a 371 national phase application of PCT/JP2012/000375 filed 23 Jan. 2012, the contents of which are incorporated herein by reference.

TECHNICAL FIELD

The present invention relates to an engine restart control apparatus mounted on a vehicle having a brake system and an engine, the vehicle having the brake system and the engine, and a vehicle control method of controlling the vehicle having the brake system and the engine.

BACKGROUND ART

In vehicles such as automobiles, idle stop is the known control to stop an engine at a stop of the vehicle and restart the engine at a start of the vehicle, so as to reduce fuel consumption and emission during the vehicle stop. In relation to this idle stop control, there are various known techniques on engine restart control to restart the engine when the booster negative pressure of the brake system or the battery capacity satisfies a predetermined condition after an engine stop. For example, the cited document 1 discloses the technique of restarting the engine when the booster negative pressure of the brake system is reduced by a predetermined ratio after a stop of the engine. The cited document 2 discloses the technique of restarting the engine when the booster negative pressure of the brake system decreases below a threshold value after a stop of the engine.

CITATION LIST

Patent Literature

Patent Document 1: JP 2002-188480A; and
Patent Document 2: JP 2011-226316A

SUMMARY

Technical Problem

In some cases, however, the above proposed technique may restart the engine even in the state that does not require an engine restart, due to the driver's driving tendency. There is accordingly still room for further improvement with respect to the technique on engine restart control.

In order to solve the above problem, the object of the invention is thus to specify the details of engine restart control and thereby reduce the possibility of an unnecessary engine restart.

Solution to Problem

In order to solve at least part of the above problems, the invention provides various aspects and embodiments described below.

Aspect 1:
An engine restart control apparatus mounted on a vehicle having an engine and a brake system including a brake booster. The engine restart control apparatus includes: a negative pressure detector configured to detect booster negative pressure of the brake booster; an engine restart controller configured to restart the engine after a stop of the engine; and a storage memory configured to store the booster negative pressure detected by the negative pressure detector. The engine restart controller restarts the engine when the booster negative pressure is reduced by a first set value or more from a reference booster negative pressure, which is detected at a predetermined timing after the stop of the engine, among booster negative pressures stored in the storage memory.

The configuration of this aspect restarts the engine when the booster negative pressure is reduced by the first set value or more from the reference booster negative pressure. This advantageously reduces the possibility of an unnecessary engine restart during idle stop.

Aspect 2:
The engine restart control apparatus of Aspect 1, which may further include: a master pressure detector configured to detect master pressure that is a fluid pressure inside a master cylinder included in the brake system, wherein the engine restart controller may restart the engine when the master pressure decreases to or below a second set value and the booster negative pressure is reduced by the first set value or more from the reference booster negative pressure.

The configuration of this aspect restarts the engine when the master pressure decreases to or below the second set value and when the booster negative pressure is reduced by the first set value or more from the reference booster negative pressure. This advantageously reduces the possibility of an unnecessary engine restart during idle stop.

Aspect 3:
The engine restart control apparatus of Aspect 2, wherein the master pressure detector may sequentially detect master pressure in time series, and the engine restart controller may use a booster negative pressure detected on appearance of a peak of the master pressure, as the reference booster negative pressure.

The configuration of this aspect restart the engine when the master pressure decreases to or below the second set value and when the booster negative pressure is reduced by the first set value or more from the booster negative pressure, which was detected on past appearance of a peak in the master pressure. This advantageously reduces the possibility of an unnecessary engine restart.

Aspect 4:
The engine restart control apparatus of Aspect 2, wherein the storage memory may store a track record of the booster negative pressure detected by the negative pressure detector, and the engine restart controller may use a booster negative pressure detected at a predetermined time before the master pressure decreases to or below the second set value, as the reference booster negative pressure.

The configuration of this aspect restarts the engine when the master pressure decreases to or below the second set value and when the booster negative pressure is reduced by the first set value or more from the booster negative pressure detected at a predetermined time before. This advantageously reduces the possibility of an unnecessary engine restart.

Aspect 5:
The engine restart control apparatus of Aspect 2, which may further include a rotational speed detector configured to detect a rotational speed of the engine, wherein the engine restart controller may use a booster negative pressure detected when the rotational speed of the engine decreases to or below a third set value, as the reference booster negative pressure.

The configuration of this aspect restarts the engine when the master pressure decreases to or below the second set value and when the booster negative pressure is reduced by the first set value or more from the booster negative pressure, which is detected at the rotation speed of the engine decreasing to or below a predetermined value. This advantageously reduces the possibility of an unnecessary engine restart.

Aspect 6:

The engine restart control apparatus of any one of Aspects 1 to 5, wherein the engine restart controller may restart the engine when the booster negative pressure is reduced by the first set value or more from the reference booster negative pressure during hill start assist control of the vehicle.

According to this aspect, the engine restart controller restarts the engine when the booster negative pressure is reduced by the first set value or more from the reference booster negative pressure during hill start assist control. This advantageously reduces the possibility of an unnecessary engine restart.

Aspect 7:

A vehicle having an engine and a brake system including a brake booster. The vehicle includes: a negative pressure detector configured to detect booster negative pressure of the brake booster; an engine restart controller configured to restart the engine after a stop of the engine; and a storage memory configured to store the booster negative pressure detected by the negative pressure detector. The engine restart controller restarts the engine when the booster negative pressure is reduced by a first set value or more from a reference booster negative pressure, which is detected at a predetermined timing after the stop of the engine, among booster negative pressures stored in the storage memory.

The vehicle of this aspect restarts the engine when the booster negative pressure is reduced by the first set value or more from the reference booster negative pressure. This advantageously reduces the possibility of an unnecessary engine restart.

Aspect 8:

The vehicle of Aspect 7, which may further include: a master pressure detector configured to detect master pressure that is a fluid pressure inside a master cylinder included in the brake system, wherein the engine restart controller may restart the engine when the master pressure decreases to or below a second set value and when the booster negative pressure is reduced by the first set value or more from the reference booster negative pressure.

The vehicle of this aspect restarts the engine when the master pressure decreases to or below the second set value and when the booster negative pressure is reduced by the first set value or more from the reference booster negative pressure. This advantageously reduces the possibility of an unnecessary engine restart.

Aspect 9:

A vehicle control method of controlling a vehicle that has an engine and a brake system including a brake booster. The vehicle control method includes the steps of: (i) detecting booster negative pressure of the brake booster; and (ii) restarting the engine when the booster negative pressure is reduced by a first set value or more from a reference booster negative pressure, which is detected at a predetermined timing after a stop of the engine.

The configuration of this aspect controls the vehicle to restart the engine when the booster negative pressure is reduced by the first set value or more from the reference booster negative pressure. This advantageously reduces the possibility of an unnecessary engine restart.

Aspect 10:

The vehicle control method of Aspect 9, which may further include the step of: (iii) detecting master pressure that is a fluid pressure inside a master cylinder included in the brake system, wherein the step (ii) may restart the engine when the master pressure decreases to or below a second set value and when the booster negative pressure is reduced by the first set value or more from the reference booster negative pressure.

The configuration of this aspect controls the vehicle to restart the engine when the master pressure decreases to or below the second set value and when the booster negative pressure is reduced by the first set value or more from the reference booster negative pressure. This advantageously reduces the possibility of an unnecessary engine restart.

The invention may be actualized by various applications: for example, a control system, an automobile, and an idle stop control apparatus respectively configured to include the engine restart control apparatus described above, a manufacturing method and a manufacturing apparatus of the engine restart control apparatus, a computer program that causes the computer to implement the functions corresponding to the respective steps of the vehicle control method, and a non-transitory storage medium which the computer program is stored in.

BRIEF DESCRIPTION OF DRAWINGS

FIG. 7 is a diagram illustrating the details of engine restart control according to a third embodiment; and FIG. 8 is a flowchart showing the flow of engine restart control according to the third embodiment.

DESCRIPTION OF EMBODIMENTS

A. First Embodiment

Figure 1:
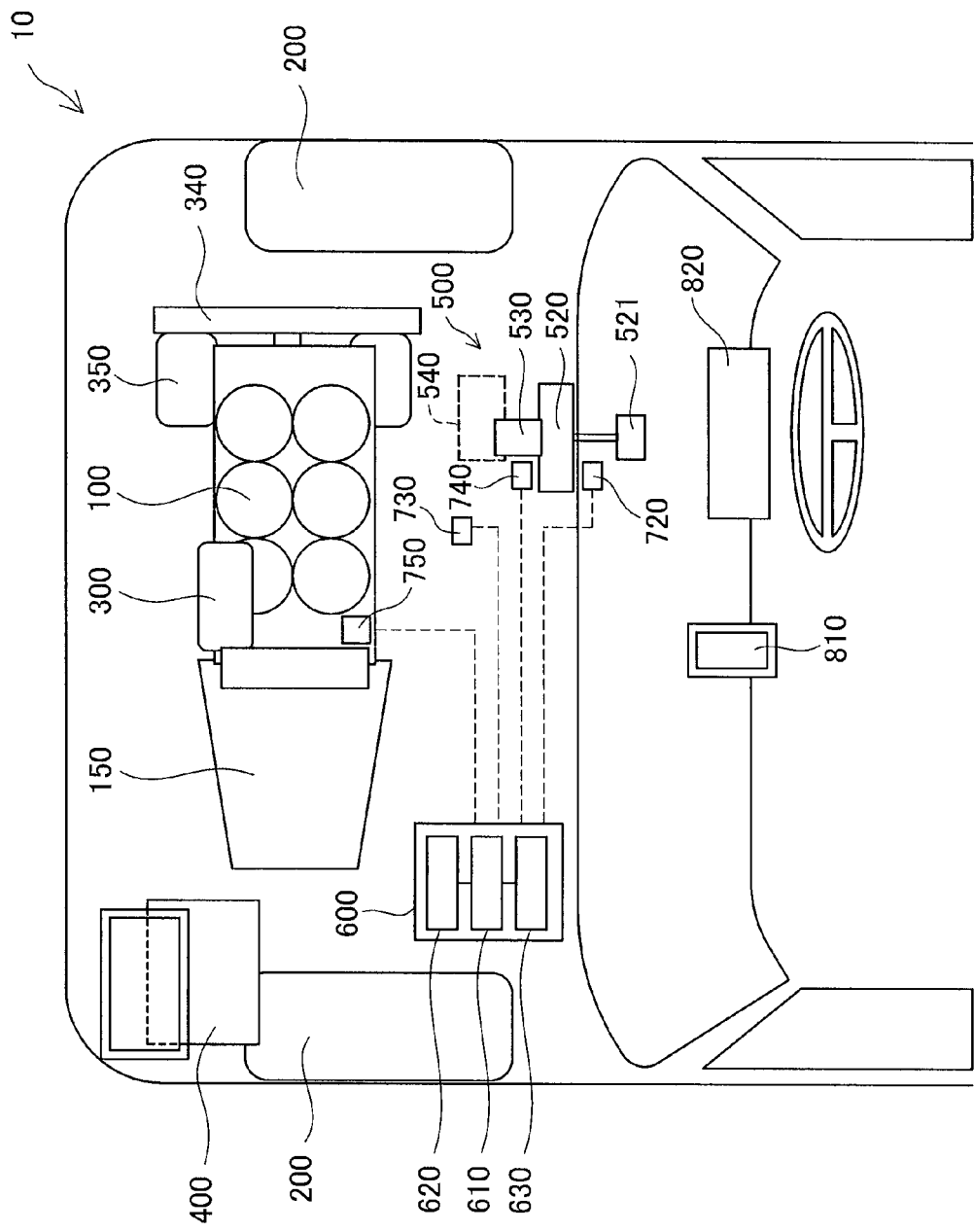
FIG. 1 is a diagram illustrating the structure of an automobile according to one embodiment of the invention.

FIG. 1 is a diagram illustrating the structure of an automobile according to one embodiment of the invention. The automobile 10 is a vehicle with idle stop function. The automobile 10 includes an engine 100, an automatic transmission 150, drive wheels 200, a starter 300, an alternator 350, a battery 400, a brake system 500 and an electrical control unit (ECU) 600.

The engine 100 is an internal combustion engine that generates power by combustion of a fuel, such as gasoline or light oil. The power of the engine 100 is transmitted to the automatic transmission 150 and is also transmitted to the alternator 350 via a drive mechanism 340. The output of the engine 100 is changed according to the driver's depression of an accelerator pedal by the electrical control unit 600.

The automatic transmission 150 automatically changes the gear ratio (gear shift change). The output (rotation speed and torque) of the engine 100 is subjected to speed change by the automatic transmission 150 and is transmitted as desired rotation speed and torque to the left and right drive wheels 200. The output of the engine 100 is transmitted to the drive wheels 200 via the automatic transmission 150 while being changed according to the degree of depression of the accelerator pedal, so as to accelerate or decelerate the vehicle (automobile 10).

The starter 300 starts the engine 100 with electric power supplied from the battery 400. In general, in response to the driver's operation of an ignition switch (not shown) to start driving the automobile, the starter 300 is activated to start the engine 100. The starter 300 is also used to restart the engine 100 in the idle stop state. The idle stop state means the state that the engine 100 stops during deceleration or stop of the automobile 10 by the control of an idle stop ECU 610.

The alternator 350 uses part of the power of the engine 100 to generate electric power. The generated electric power is used to charge the battery 400 via an inverter (not shown). This alternator 350 may also be used as a starter motor to restart the engine 100 in the idle stop state. The drive mechanism 340 is provided as a mechanical part to transmit the power of the engine 100 to the alternator 350 and is a belt drive according to this embodiment. The battery 400 is a lead acid battery used as a DC power source having voltage of 14V to supply electric power to auxiliary machinery. The motor vehicle 10 is equipped with, for example, a lighting system, windshield wipers and an air-conditioner (A/C) as the auxiliary machinery.

The brake system 500 is a mechanism to apply the braking force to the automobile 100 in response to application of a brake pedal 521. The brake system 500 includes a brake booster 520, a master cylinder 530 and a brake actuator 540. The concrete structure of the brake system 500 will be described later with reference to FIG. 2.

The electrical control unit 600 is configured to have an idle stop ECU 610, an engine ECU 620 and a transmission ECU 630. Each of the ECUs 610, 620 and 630 is implemented by a computer including a CPU, a ROM and a RAM. The electrical control unit 600 may include any additional ECU other than those mentioned above, for example, a motor ECU for auxiliary machinery to operate the auxiliary machinery during stop of the engine 100. The respective ECUs 610, 620 and 630 receive supply of electric power from the battery 400. The electrical control unit 600 corresponds to the "engine restart controller" of the claims.

The idle stop ECU 610 performs idle stop control including engine stop control and engine restart control. The engine stop control is a control procedure to stop the engine upon satisfaction of predetermined conditions. The engine restart control is a control procedure to restart the engine during stop upon satisfaction of predetermined conditions. The idle stop ECU 610 is connected respectively via signal lines with the engine ECU 620 and the transmission ECU 630 to allow two-way communication. The idle stop ECU 610 is also connected respectively via signal lines with a stroke sensor 720 to detect the degree of application SL of the brake pedal 521 (stroke SL), a negative pressure sensor 730 to detect negative pressure NP of a negative pressure-generating pipe 522 (FIG. 2) described later (booster negative pressure NP), a master cylinder pressure sensor 740 to detect fluid pressure MP of brake fluid in the master cylinder 530 (master pressure MP) and an engine rotational speed sensor 750 to detect rotational speed NE of the engine 100 (engine rotational speed NE). In the idle stop ECU 610, a computer program executed by the CPU to perform idle stop control is stored in the ROM.

The idle stop ECU 610 has a storage memory to store the booster negative pressure NP detected by the negative pressure sensor 730 during stop of the engine 100. The storage memory may be implemented by, for example, the RAM of the idle stop ECU 610. The idle stop ECU 610 performs engine restart control to restart the engine 100 when the master pressure MP decreases to or below a predetermined level after stop of the engine 100 and when the booster negative pressure is reduced by a predetermined degree or more relative to the specific booster negative pressure stored in the storage memory. The detailed procedure of the engine restart control is described later with reference to FIGS. 3 and 4.

The engine EU 620 is connected respectively via signal lines with an engine rotational speed sensor 750, wheel speed sensors (not shown) and an accelerator opening sensor (not shown). The engine ECU 620 adjusts the amount of fuel injection and the throttle opening based on the information detected by these sensors to control the operating state of the engine 100. The engine ECU 620 stops the fuel injection to the engine 100 to stop the operation of the engine 100, in response to a request from the idle stop ECU 610 during stop of the vehicle. The engine ECU 620 also controls the starter 300 or the alternator 350 to start the engine 100, in response to a request from the idle stop ECU 610.

The transmission ECU 630 is connected respectively via signals lines with the wheel speed sensors (not shown), the accelerator opening sensor (not shown) and a gearshift position sensor (not shown). The transmission ECU 630 controls a hydraulic actuator (not shown) based on the information detected by these sensors to change the gear ratio of the automatic transmission 150.

The automobile 10 may additionally include a cancel switch 810 and an instrument panel 820. The cancel switch 810 is operated to cancel an ECO mode. When the cancel switch 810 is ON, the idle stop ECU 610 does not perform the idle control. The instrument panel 820 is adapted to display non-selection or selection of the ECO mode in response to ON and OFF of the cancel switch 810.

Figure 2:
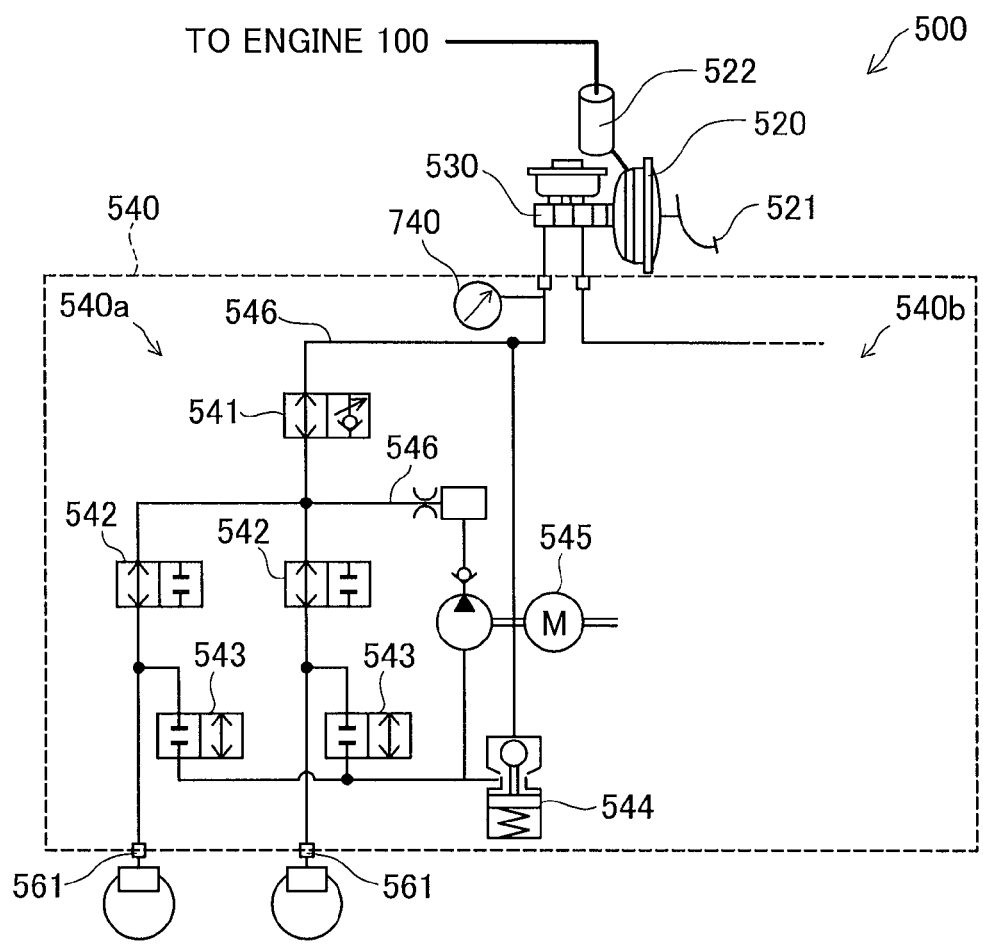
FIG. 2 is a diagram illustrating the general structure of a brake system.

FIG. 2 is a diagram illustrating the general structure of the brake system. The brake system 500 is a so-called inline brake system and includes the brake booster 520, the master cylinder 530 and the brake actuator 540. The brake booster 520 is a servo unit to assist the pedal force when the brake pedal 521 is applied. The brake booster 520 has the negative pressure-generating pipe 522 to receive the negative pressure from the engine 100. The negative pressure-generating pipe 522 is connected with the air intake system of the engine 100. The brake booster 520 receives the negative pressure generated in the intake stroke of the engine 100, uses the received negative pressure to assist the brake force of the brake pedal 521, and transmits the assisted pedal force to the master cylinder 530. The internal negative pressure NP of the negative pressure-generating pipe 522 (booster negative pressure NP) is detected by the negative pressure sensor 730.

The master cylinder 530 is placed between the brake booster 520 and the brake actuator 540 to convert the pedal force assisted by the brake booster 520 into fluid pressure of the brake fluid and transmit the converted fluid pressure to the brake actuator 540. The fluid pressure MP of the brake fluid in the master cylinder 530 (master pressure MP) is detected by the master cylinder pressure sensor 740.

The brake actuator 540 is placed between the master cylinder 530 and wheel cylinders 561 to transmit the fluid pressure of the brake fluid obtained from the master cylinder 530 to the wheel cylinders 561. The brake actuator 540 is a VSC (Vehicle Stability Control) actuator and includes a master cutoff valve 541 provided as a linear control valve for adjustment of the fluid pressure, a pressure holding valve 542 and a pressure reducing valve provided as on-off valves, an accumulator 544 arranged to allow accumulation of the brake fluid and a pressure pump (pump-up motor) 545 arranged to increase the pressure of the brake fluid. The respective valves 541 to 543, the accumulator 544 and the pressure pump 545 are interconnected via a brake fluid piping 546.

When the brake pedal 521 is applied, the brake actuator 540 transmits the fluid pressure obtained from the master cylinder 530 to the wheel cylinders 561 of the respective wheels via the respective valves 541 to 543. In this process, the brake actuator 540 is allowed to increase the pressure of the brake fluid by the pressure pump 545. Transmission of the fluid pressure obtained from the master cylinder 530 to the wheel cylinders 561 actuates the brake mechanism including brake pads and brake rotors of the respective wheels to apply the braking force to the respective wheels. According to this embodiment, the brake actuator 540 has two brake systems, i.e., first system 540a and second system 540b. The brake actuator 540 transmits the fluid pressure obtained from the master cylinder 530 to the wheel cylinders 561 of the front wheels by the first system 540a and to the wheel cylinders 561 of the rear wheels by the second system 540b. The second system 540b has the same structure as that of the first system 540a and is thus omitted from the illustration of FIG. 2.

The electrical control unit 600 of this embodiment performs hill start assist control (HAC control) to hold the braking force during hill stop of the automobile 10. More specifically, when the brake pedal 521 is applied to stop the automobile 10, in response to detection of the hill stop of the automobile 10, the electrical control unit 600 controls the brake system 500 to close the master cutoff valve 541. Even when the brake force of the brake pedal 521 is insufficient to hold the braking force during hill stop of the vehicle, such brake control holds the pressure of the brake fluid to the wheel cylinders 561.

Figure 3:
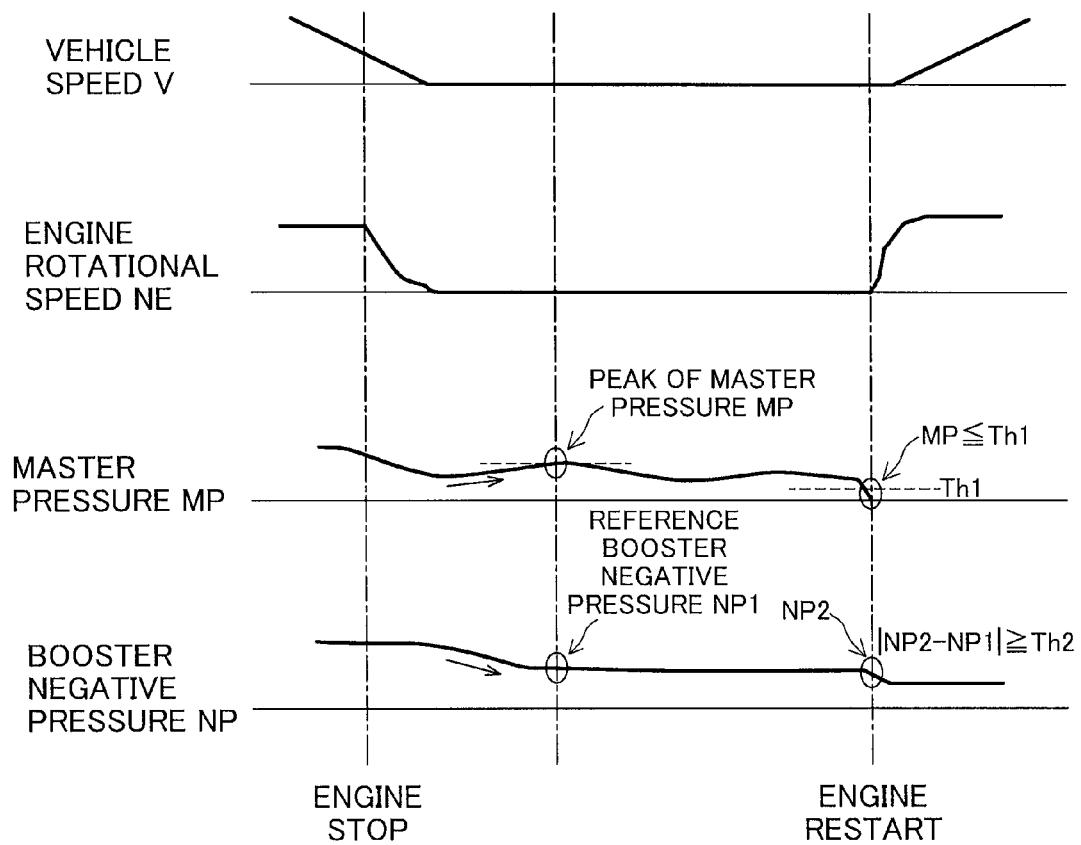
FIG. 3 is a diagram illustrating the details of engine restart control.

FIG. 3 is a diagram illustrating the details of engine restart control. The idle stop ECU 610 restarts the engine 100, when the master pressure MP decreases to or below a threshold value Th1 (MP≤Th1) after stop of the engine 100 and when the booster negative pressure NP (NP2 in FIG. 2) at this time is reduced by a threshold value Th2 or more from a reference booster negative pressure NP1 described below (|NP2−NP1|≥Th2). The reference booster negative pressure NP1 is the booster negative pressure NP detected at a predetermined timing after the stop of the engine 100. According to the first embodiment, the reference booster negative pressure NP1 is the booster negative pressure NP detected at a peak of the master pressure MP after the stop of the engine 100. The threshold value Th1 of the embodiment corresponds to the "second set value" of the claims. The threshold value Th2 of the embodiment corresponds to the "first set value" of the claims.

The conventional engine restart control restarts the engine upon satisfaction of any one of a plurality of independent engine restart conditions, e.g., reduction of the master pressure, decrease of the booster negative pressure and decrease of the battery capacity after the engine stop. Among these engine restart conditions, the engine restart condition with regard to reduction of the master pressure MP is generally provided to allow reflection of the driver's braking intention. Based on reduction in degree of the driver's application of the brake pedal, the driver is expected to have no intention of continuing braking.

There is, however, a case that the engine restarts at the driver's unexpected timing due to the reduction of the master pressure, despite the driver's intention of continuing braking. This may arise from the structure of the brake system, such as the arrangement of the brake system and the position of the master cylinder pressure sensor. For example, in the brake system 500 shown in FIG. 2, the master cylinder pressure sensor 740 is located upstream of the master cutoff valve 541 (on the master cylinder 530-side). This positional relationship causes reduction of the volume of the brake fluid piping 546 connected with the master cylinder pressure sensor 740 (volume of brake fluid) when the hill start assist control is performed to close the master cutoff valve 541. As a result, after the master cutoff valve 541 is closed, even a slight movement of the brake pedal 521 causes a significant change in pressure detected by the master cylinder pressure sensor 740. Such a variation in correspondence relationship between the change in degree of application of the brake pedal 521 and the change in pressure detected by the master cylinder pressure sensor 740 substantially changes the engine restart condition. This is likely to cause a problem that the engine restarts at the driver's unexpected timing. This problem is especially significant for the driver who is unlikely to stably stop the brake pedal during idle stop.

According to this embodiment, the idle stop ECU 610 does not allow a restart of the engine upon satisfaction of only the engine restart condition that the master pressure MP decreases to or below the threshold value Th1 (MP≤Th1), but allows a restart of the engine upon satisfaction of the additional engine restart condition that the booster negative pressure NP2 at this time is reduced by the threshold value Th2 or more from the reference booster negative pressure NP1 (|NP2−NP1|≥Th2) (FIG. 3). The condition with regard to the booster negative pressure is taken into account, since the correspondence relationship between the degree of application of the brake pedal and the booster negative pressure is hardly affected by the open-close state of the master cutoff valve 541. Combining the engine restart condition with regard to the master pressure with the condition with regard to the booster negative pressure effectively reduces the possibility of an engine restart against the driver's intention. In other words, the engine restart condition with regard to the master pressure may be substantially changed by closing the master cutoff valve 541. This may cause satisfaction of the engine restart condition with regard to the master pressure, despite the driver's intention of continuing braking. In this state, however, the difference between the booster negative pressure NP2 and the reference booster negative pressure NP1 (|NP2−NP1|) falls into a predetermined range (<Th2), so that the engine 100 is not restarted. Such control enables the engine stop state to be continued according to the driver's intention.

According to the first embodiment, the booster negative pressure NP detected at a peak of the master pressure MP after the stop of the engine 100 is set to the reference booster negative pressure NP1. The booster negative pressure that slightly rises with a slight reduction in degree of application of the brake pedal 521 after the engine stop and lowers again with a subsequent increase in degree of application of the brake pedal 521 may thus be set to the reference booster negative pressure NP1. Such setting effectively reduces the possibility that the absolute value (|NP2−NP1|) of the reduction of the booster negative pressure NP2 relative to the reference booster negative pressure NP1 becomes equal to or greater than the threshold value Th2. This accordingly reduces the occurrence of the problem that the condition with regard to the booster negative pressure (|NP2−NP1|≥Th2) is satisfied despite the driver's intention of continuing braking. The following describes the flow of engine restart control according to the embodiment.

Figure 4:
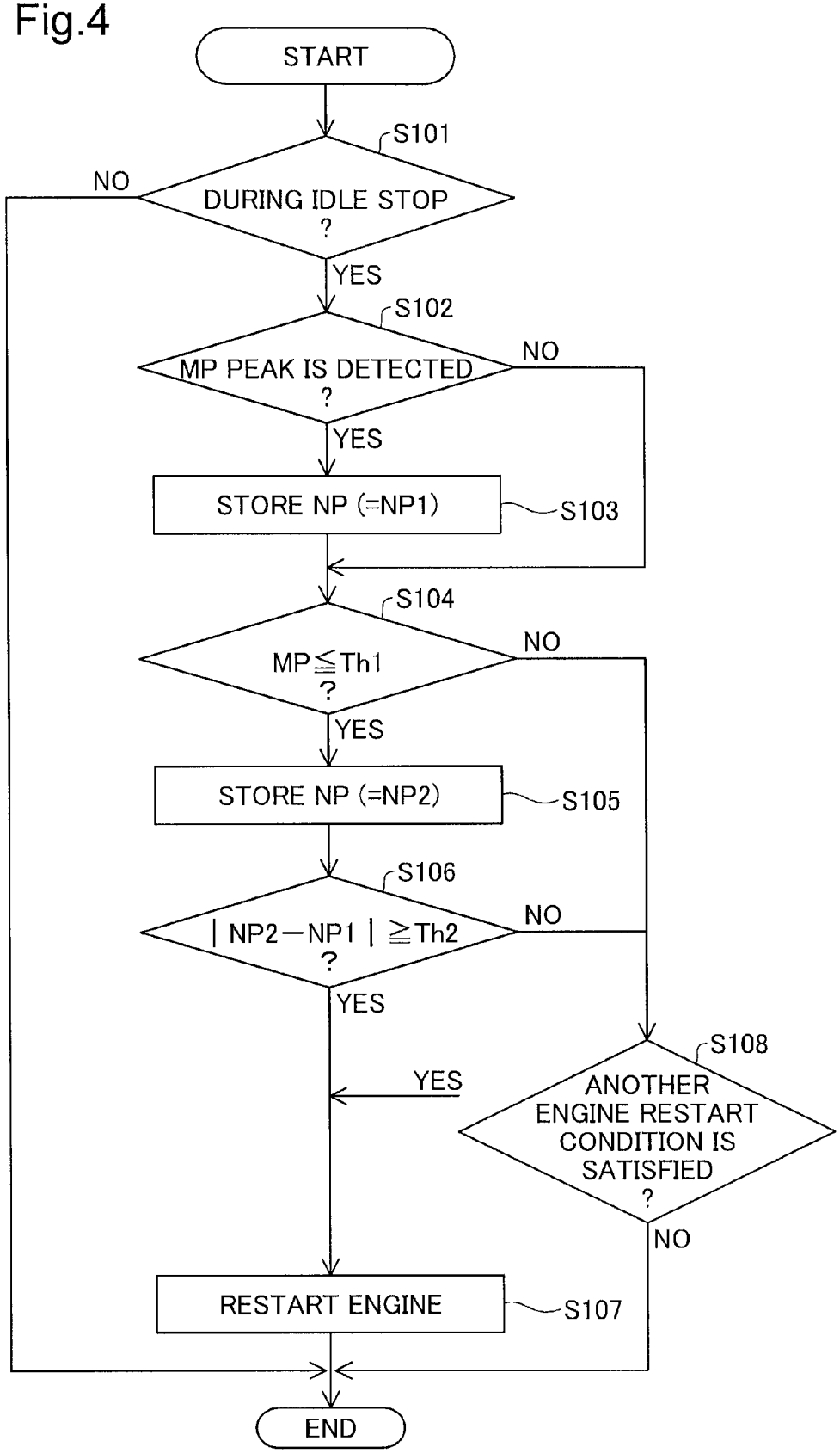
FIG. 4 is a flowchart showing the flow of engine restart control.

FIG. 4 is a flowchart showing the flow of engine restart control. The idle stop ECU 610 repeatedly executes the routine of FIG. 4 at predetermined intervals. The idle stop ECU 610 first determines whether or not the automobile 10 is during idle stop (step S101). Determination of whether or not the automobile 10 is during idle stop may be, for example, based on the engine rotational speed Ne (FIG. 3).

When the automobile 10 is not during idle stop (step S101: NO), the automobile 10 may be moving or may be at a stop without stopping the engine 100. In such cases, there is no need to restart the engine. The idle stop ECU 610 accordingly repeats the determination of step S101 until detection of the automobile 10 in the idle stop state.

When the automobile 10 is during idle stop (step S101: YES), the idle stop ECU 610 detects a peak of the master pressure MP if any (step S102). The peak of the master pressure MP (FIG. 3) may be detected, for example, when a variation $\Delta MP$ ($\Delta MP = MP_{t+1} - MP_t$) in master pressure MP sequentially detected in time series by the master cylinder pressure sensor 740 changes from positive ($\Delta MP > 0$) to negative ($\Delta < 0$).

When a peak of the master pressure MP is detected (step S102: YES), the idle stop ECU 610 stores the booster negative pressure NP detected at the peak of the master pressure MP by the negative pressure sensor 730 in a storage memory (not shown) as the reference booster negative pressure NP1 (step S103). When a peak of the master pressure MP is detected again after storage of the reference booster negative pressure NP1 in the storage memory, the idle stop ECU 610 updates the reference booster negative pressure NP1 stored in the storage memory by the booster negative pressure NP newly detected at the newly detected peak by the negative pressure sensor 730.

When no peak of the master pressure MP is detected (step S102: NO), on the other hand, the idle stop ECU 610 skips the processing of step S103. The idle stop ECU 610 then determines whether the master pressure MP decreases to or below a threshold value Th1 (step S104). The threshold value Th1 may be set arbitrarily and is stored in advance in the ROM of the idle stop ECU 610.

When the master pressure MP decreases to or below the threshold value Th1 (step S104: YES), the idle stop ECU 610 stores the booster negative pressure NP2 detected by the negative pressure sensor 730 at the master pressure MP equal to the threshold value Th1 into a storage memory (not shown) (step S105). The idle stop ECU 610 then determines whether the booster negative pressure NP2 detected at step S105 is reduced by a threshold value Th2 or more from the reference booster negative pressure NP1 (step S106). More specifically, it is determined whether the absolute value (|NP2−NP1|) of the difference between the booster negative pressure NP2 and the reference booster negative pressure NP1 is equal to or greater than the threshold value Th2 (|NP2−NP1|≥Th2).

When the absolute value of the difference between the booster negative pressure NP2 and the reference booster negative pressure NP1 is equal to or greater than the threshold value Th2 (step S106: YES), the decrease of the master pressure MP to or below the threshold value Th1 is attributable to the driver's starting intention. The idle stop ECU 610 accordingly restarts the engine 100 (step S107).

When the master pressure MP does not decrease to or below the threshold value Th1 (step S104: NO) or when the absolute value of the difference between the booster negative pressure NP2 and the reference booster negative pressure NP1 is less than the threshold value Th2 (step S106: NO), on the other hand, the driver is expected to have no starting intention. The idle stop ECU 610 accordingly does not restart the engine 100, based on the decrease of the master pressure MP. Instead, the idle stop ECU 610 determines whether an engine restart condition other than the decrease of the master pressure MP is satisfied (step S108). The other engine restart condition may be, for example, reduction of the battery capacity or decrease of the booster negative pressure. When the other engine restart condition is satisfied (step S108: YES), the idle stop ECU 610 restarts the engine 100 (step S107). This is because the engine restart is likely to be needed by another requirement, despite the driver's intention of not starting. This is the flow of engine restart control.

B. Second Embodiment

The first embodiment describes the configuration of setting the booster negative pressure NP at a peak of the master pressure MP to the reference booster negative pressure NP1 in the engine restart control. The reference booster negative pressure NP1 is, however, not limited to the booster negative pressure NP detected at the above timing but may be set to a booster negative pressure NP detected at any other arbitrary timing. As one example of such other setting, a second embodiment describes the configuration of setting the booster negative pressure NP detected at a predetermined time before the master pressure MP decreases to or below the threshold value Th1 to the reference booster negative pressure NP1. The general structure of the automobile 10 is similar to that of the first embodiment and is thus not specifically described here.

Figure 5:
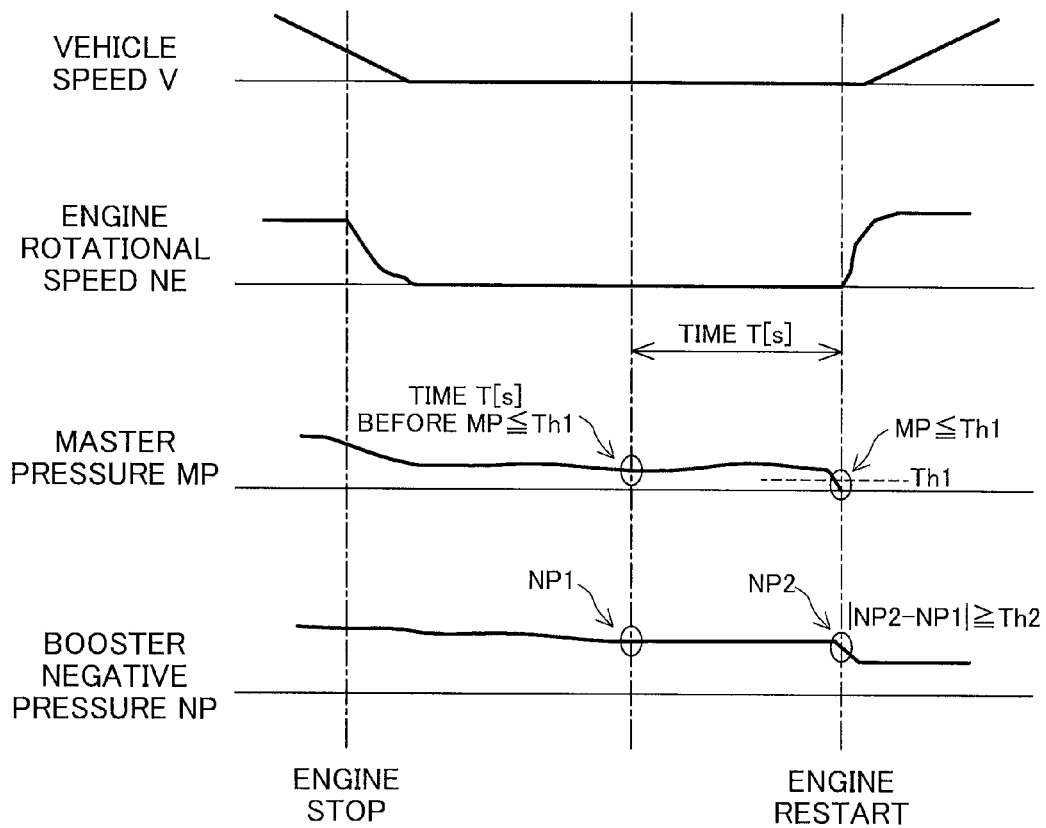
FIG. 5 is a diagram illustrating the details of engine restart control according to a second embodiment.

FIG. 5 is a diagram illustrating the details of engine restart control according to the second embodiment. Like the first embodiment, according to the second embodiment, the idle stop ECU 610 restarts the engine 100 when the master pressure MP decreases to or below the threshold value Th1 (MP≤Th1) during stop of the engine 100 and when the booster negative pressure NP2 at this time is reduced by the threshold value Th2 or more from the reference booster negative pressure NP1 (|NP2−NP1|≥Th2). According to the second embodiment, however, the reference booster negative pressure NP1 is set to the booster negative pressure NP detected at a time T[s] (for example, T=2) before the master pressure MP decreases to or below the threshold value Th1 after the stop of the engine 100. Setting the reference booster negative pressure NP1 to the booster negative pressure NP detected at a predetermined time before the master pressure MP decreases to or below the threshold value Th1 reduces the potential effect of time-dependent reduction of the booster negative pressure NP from detection of the reference booster negative pressure NP1 to detection of the booster negative pressure NP2 even when the vehicle stops for a long time. In other words, this reduces the possibility of the problem that the condition with regard to the booster negative pressure (|NP2−NP1|≥Th2) is satisfied despite the driver's intention of continuing braking, due to elapse of a long time from detection of the reference booster negative pressure NP1 to detection of the booster negative pressure NP2. The time T may be set arbitrarily and is stored in advance in the ROM of the idle stop ECU 610.

Figure 6:
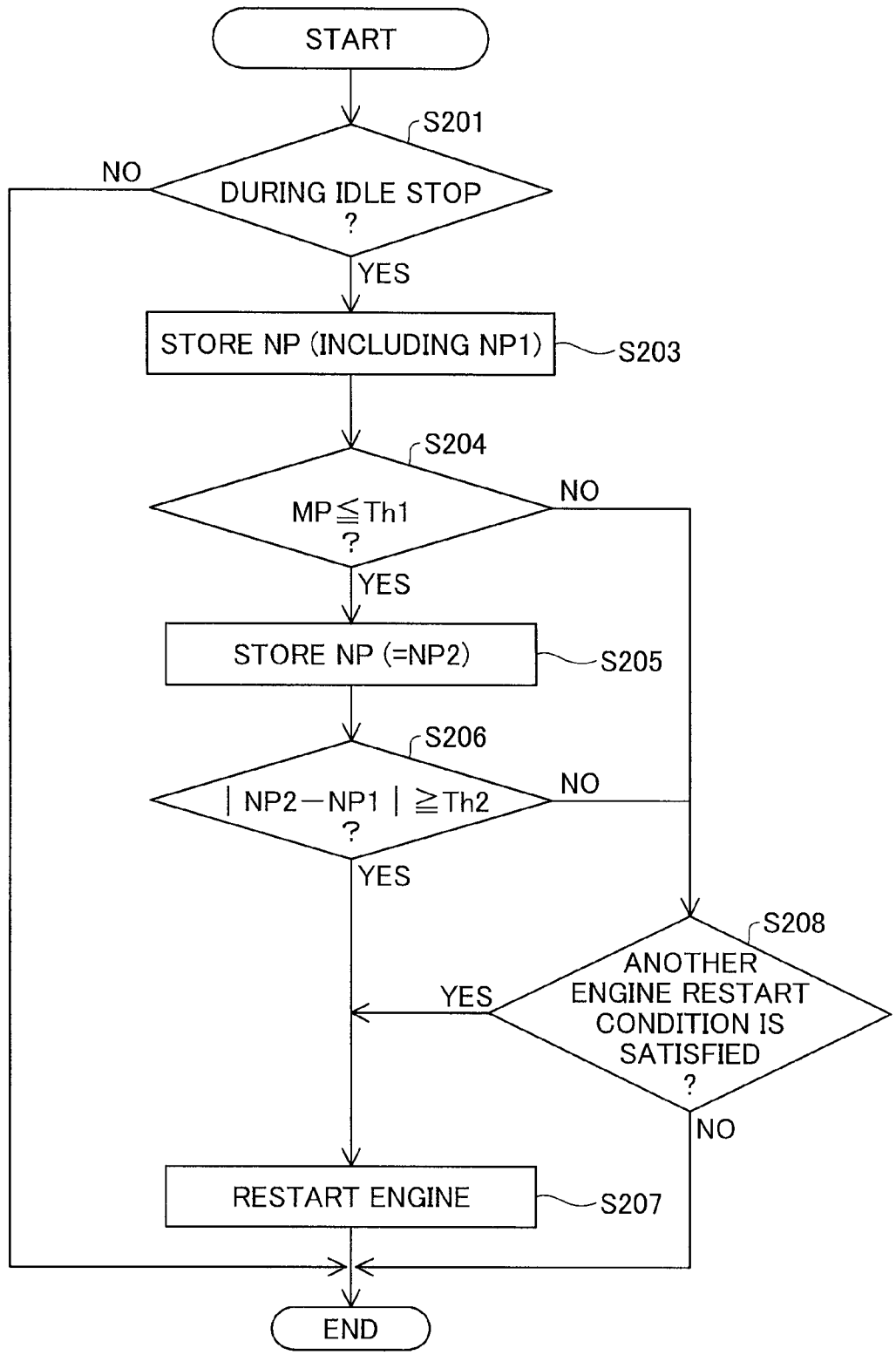
FIG. 6 is a flowchart showing the flow of engine restart control according to the second embodiment.

FIG. 6 is a flowchart showing the flow of engine restart control according to the second embodiment. The following describes the differences from the engine restart control described in the first embodiment. The idle stop ECU 610 sequentially stores the booster negative pressures NP detected by the negative pressure sensor 730 into a storage memory (not shown) (step S203). It is preferable to store the booster negative pressure NP in correlation to the time when the booster negative pressure NP is detected. This enables a track record of the booster negative pressures NP detected by the negative pressure sensor 730 to be stored in the storage memory. At this time, it has not yet been determined which of the booster negative pressures NP stored in the storage memory is to be set to the reference booster negative pressure NP1.

Upon detection that the master pressure MP decreases to or below the threshold value Th1 (step S204: YES), the idle stop ECU 610 stores the booster negative pressure NP at this moment as the booster negative pressure NP2 (step S205). The idle stop ECU 610 also specifies the booster negative pressure NP detected at the time T[s] before the master pressure MP decreases to or below the threshold value Th1 among the booster negative pressures NP stored in the storage memory and sets the specified booster negative pressure NP to the reference booster negative pressure NP1. The idle stop ECU 610 then determines whether the booster negative pressure NP2 is reduced by the threshold value Th2 or more from the specified reference booster negative pressure NP1 (step S206). The processing of steps S207 and S208 is identical with the processing of steps S107 and S108 of the first embodiment. This is the flow of engine restart control according to the second embodiment.

As described above, the engine restart control of the second embodiment also does not allow a restart of the engine upon satisfaction of only the engine restart condition that the master pressure MP decreases to or below the threshold value Th1 (MP≤Th1), but allows a restart of the engine upon satisfaction of the additional engine restart condition that the booster negative pressure NP2 at this time is reduced by the threshold value Th2 or more from the reference booster negative pressure NP1 (|NP2−NP1|≥Th2). The engine restart condition with regard to the master pressure may be substantially changed, due to the structure of the brake system. This may cause satisfaction of the engine restart condition with regard to the master pressure, despite the driver's intention of continuing braking. In this state, however, the difference between the booster negative pressure NP2 and the reference booster negative pressure NP1 (|NP2−NP1|) falls into the predetermined range (<Th2), so that the engine 100 is not restarted.

C. Third Embodiment

A third embodiment describes the configuration of setting the booster negative pressure NP detected when the engine rotational speed NE reaches a predetermined value in the engine restart control. The general structure of the automobile 10 is similar to that of the first embodiment and is thus not specifically described here.

FIG. 7 is a diagram illustrating the details of engine restart control according to the third embodiment. Like the first embodiment, according to the third embodiment, the idle stop ECU 610 restarts the engine 100 when the master pressure MP decreases to or below the threshold value Th1 (MP≤Th1) during stop of the engine 100 and when the booster negative pressure NP2 at this time is reduced by the threshold value Th2 or more from the reference booster negative pressure NP1 (|NP2−NP1−≥Th2). According to the third embodiment, however, the reference booster negative pressure NP1 is set to the booster negative pressure NP detected when the engine rotational speed NE reaches a set value NS (for example, NS=0). This enables relatively easy detection of the reference booster negative pressure NP1. The set value NS may be set arbitrarily and is stored in advance in the ROM of the idle stop ECU 610. In the following description, it is assumed that "NS=0" is set as the set value NS.

FIG. 8 is a flowchart showing the flow of engine restart control according to the third embodiment. The following describes the differences from the engine restart control described in the first embodiment. The idle stop ECU 610 determines whether the engine rotational speed NE reaches 0 (step S302). When the engine rotational speed NE has not yet reached 0 (step S302: NO), the idle stop ECU 610 repeats the processing of steps S301 and S302 until the engine rotational speed NE reaches 0.

When the engine rotational speed NE reaches 0 (step S302: YES), the idle stop ECU 610 stores the booster negative pressure NP detected at the engine rotational speed NE equal to 0 by the negative pressure sensor 730 into a storage memory (not shown) as the reference booster negative pressure NP1 (step S303). The processing of subsequent steps S304 to S308 is identical with the processing of steps S104 to S108 of the first embodiment. This is the flow of engine restart control according to the third embodiment.

As described above, the engine restart control of the third embodiment also does not allow a restart of the engine upon satisfaction of only the engine restart condition that the master pressure MP decreases to or below the threshold value Th1 (MP≤Th1), but allows a restart of the engine upon satisfaction of the additional engine restart condition that the booster negative pressure NP2 at this time is reduced by the threshold value Th2 or more from the reference booster negative pressure NP1 (|NP2−NP1|≥Th2). Combining the engine restart condition with regard to the master pressure with the condition with regard to the booster negative pressure in this manner effectively reduces the possibility of engine restart against the driver's intention.

D. Modifications

The invention is not limited to the above embodiments or examples, but a multiplicity of variations and modifications may be made to the embodiments without departing from the scope of the invention. Some examples of possible modifications are given below.

D-1. Modification 1

According to the engine restart control of the first embodiment, the idle stop ECU 610 stores the booster negative pressure NP into the storage memory upon detection of a peak of the master pressure MP. According to one modification, the idle stop ECU 610 may sequentially store the booster negative pressures NP into the storage memory regardless of the state of the master pressure MP and set a flag on the booster negative pressure NP upon detection of a peak of the master pressure MP. The reference booster negative pressure NP may be the booster negative pressure detected at a predetermined time after detection of a peak of the master pressure MP.

D-2. Modification 2

The engine restart control of the first embodiment determines whether another engine restart condition is satisfied at step S108. The processing of step S108 may, however, be omitted.

D-3. Modification 3

The above embodiments describe the automobile 10 as one example of the vehicle. The vehicle is, however, not limited to the automobile but may be any vehicle other than automobile, for example, train vehicle. The automobile 10 has the automatic transmission 150 according to the above embodiment but may have a manual transmission.

D-4. Modification 4:

In any of the embodiments described above, part of the software configuration may be replaced by the hardware configuration (for example, integrated circuit), and part of the hardware configuration may be replaced by the software configuration.

REFERENCE SIGNS LIST

10: Automobile
100: Engine
150: Automatic transmission
200: Drive wheel

300: Starter
340: Drive mechanism
350: Alternator
400: Battery
500: Brake system
520: Brake booster
522: Negative pressure-generating pipe
530: Master cylinder
540: Brake actuator
541: Master cutoff valve
542: Pressure holding valve
543: Pressure reducing valve
544: Accumulator
545: Pressure pump
546: Brake fluid piping
561: Wheel cylinder
600: Electrical control unit
610: Idle stop ECU
620: Engine ECU
630: Transmission ECU
720: Stroke sensor
730: Negative pressure sensor
740: Master cylinder pressure sensor
750: Engine rotational speed sensor
810: Cancel switch
820: Instrument panel

The invention claimed is:

1. An engine restart control apparatus mounted on a vehicle having an engine and a brake system including a brake booster, the engine restart control apparatus comprising:
a negative pressure detector configured to detect booster negative pressure of the brake booster;
an engine restart controller configured to restart the engine after a stop of the engine; and
a master pressure detector configured to detect master pressure that is a fluid pressure inside a master cylinder included in the brake system,
a storage memory configured to store the booster negative pressure detected by the negative pressure detector,
wherein the engine restart controller restarts the engine when the booster negative pressure is reduced by a first set value or more from a reference booster negative pressure, the reference booster negative pressure being selected among booster negative pressures stored in the storage memory as a pressure value detected at a predetermined timing after the stop of the engine, and the engine restart controller restarts the engine when the master pressure decreases to or below a second set value.

2. The engine restart control apparatus according to claim 1, wherein
the master pressure detector sequentially detects master pressure in time series, and
the engine restart controller uses a booster negative pressure detected upon appearance of a peak of the master pressure, as the reference booster negative pressure.

3. The engine restart control apparatus according to claim 1, wherein
the storage memory stores a track record of the booster negative pressure detected by the negative pressure detector, and
the engine restart controller uses a booster negative pressure detected at a predetermined time before the master pressure decreases to or below the second set value, as the reference booster negative pressure.

4. The engine restart control apparatus according to claim 1, further comprising:
a rotational speed detector configured to detect a rotational speed of the engine,
wherein the engine restart controller uses a booster negative pressure detected when the rotational speed of the engine decreases to or below a third set value, as the reference booster negative pressure.

5. The engine restart control apparatus according to claim 1, wherein
the engine restart controller restarts the engine when the booster negative pressure is reduced by the first set value or more from the reference booster negative pressure during hill start assist control of the vehicle.

6. A vehicle having an engine and a brake system including a brake booster, the vehicle comprising:
a negative pressure detector configured to detect booster negative pressure of the brake booster;
an engine restart controller configured to restart the engine after a stop of the engine; and
a master pressure detector configured to detect master pressure that is a fluid pressure inside a master cylinder included in the brake system,
a storage memory configured to store the booster negative pressure detected by the negative pressure detector,
wherein the engine restart controller restarts the engine when the booster negative pressure is reduced by a first set value or more from a reference booster negative pressure, the reference booster negative pressure being selected among booster negative pressures stored in the storage memory as a pressure value detected at a predetermined timing after the stop of the engine, and the engine restart controller restarts the engine when the master pressure decreases to or below a second set value.

7. A vehicle control method of controlling a vehicle that has an engine and a brake system including a brake booster, the vehicle control method comprising the steps of:
(i) detecting booster negative pressure of the brake booster and detecting master pressure that is a fluid pressure inside a master cylinder included in the brake system; and
(ii) restarting the engine when the master pressure decreases to or below a second set value and the booster negative pressure is reduced by a first set value or more from a reference booster negative pressure, the reference booster negative pressure being detected at a predetermined timing after a stop of the engine.

* * * * *